March 17, 1970  R. M. KLEES  3,501,762
MULTISENSOR CORRELATION APPARATUS

Filed Nov. 25, 1964  3 Sheets-Sheet 1

INVENTOR.
ROBERT M. KLEES

BY *Roy M. Pitts*

ATTORNEY

INVENTOR.
ROBERT M. KLEES

*INVENTOR.*
ROBERT M. KLEES
BY
ATTORNEY

United States Patent Office 3,501,762
Patented Mar. 17, 1970

3,501,762
MULTISENSOR CORRELATION APPARATUS
Robert M. Klees, Costa Mesa, Calif., assignor to North American Rockwell Corporation, a corporation of Delaware
Filed Nov. 25, 1964, Ser. No. 413,726
Int. Cl. G01s 9/00
U.S. Cl. 343—6                                9 Claims The subject invention relates to means for providing an improved signal for target display and mapping purposes, and more particularly to means for correlating reflective signals and radiative signals of a detected target which is both reflective and radiative.

In the detection and identification of offensive targets, it is frequently desirable to use a passive sensor such as an IR sensor and an active sensor such as a monopulse radar in combination. By means of such combination, a cultured or man-made target of interest which is both reflective (to the directed energy of the active sensor) and radiative (of the energy sensed by the passive sensor) may be distinguished from merely either reflective targets or radiative targets. Also, by means of such combination, the range of such radiative targets may be determined. Further, because of the increased angular resolution obtainable by optical techniques, both the angular resolution and range resolution of the slant radar range to such multiple or radiative-and-reflective target may be improved over that of merely reflective targets by means of modulating one of the received reflective and radiative signals by the other of them, as described in co-pending U.S. application Ser. No. 356,357, filed Mar. 30, 1964, by Jerome M. Page, assignor to North American Aviation, Inc., assignee of the subject invention.

The practical implementation of such multiple sensor arrangement, however, relies on effective means for correlating the passive sensor response with the range time response of the active sensor, whereby the range as well as direction of a passively detected radiative target may be determined. The concept of the above mentioned U.S. application Ser. No. 356,357, filed Mar. 30, 1964, is to continuously slave the optical axis of the IR sensor to the direction of a received monopulse target signal by directly controlling the field of view of an image orthicon tube, in accordance with a radar target angle signal from a radar system. However, such a mechanization requires extreme linearity, high response speed, and careful calibration of the control circuits, as to present a number of design difficulties which are overcome or avoided by the concept of the subject invention.

The concept of the subject invention relates to means cooperating with a scan converter for correlating the time occurrence of a passive sensor response with the response of an active sensor to effect a range correlation of the signals received by the passive sensor.

In a preferred embodiment of the invention there is provided a monopulse ranging means providing periodic received signals having a magnitude and time occurrence indicative of the direction and range distance respectively, of a detected radar target. There is also provided a passive sensor having a line of sight whose direction periodically varies relative to the boresight axis of the monopulse means. There is further provided scan converter means responsive to the passive sensing means for storing the response thereof to radiative targets as a function of the direction thereof, the scan converter means being further responsive to the monopulse ranging means for reading out the stored response as a function of the direction of a reflective target return and at the time of occurrence of such reflective return.

In normal operation of the above described arrangement, the variable direction of the passive sensor is maintained within the broader beamwidth of the monopulse ranging means. By interrogating the scan converter with the angle-off-boresight of a detected monopulse target, a stored radiative target return signal, corresponding to such direction, is read-out, the range-time or time-occurrence of the monopulse signal received from such direction providing a correlative range indication for the stored passive sensor response associated with such direction.

By means of the above described arrangement, range-correlation is obtained for the passive sensor response. Also, because of the scan converter means for correlating the direction of the radiative received signal with the direction and range-time of a monopulse received return, the scanning motion of the passive sensor need not be precisely synchronized with the pulse repetition periods of the ranging means. In other words, means is provided for converting one of two cyclical, time-varying signals having mutually distinguishable time bases, into the time base of the other. Hence, a simple scanning arrangement may be employed by the passive sensing means. Accordingly, it is an object of the invention to provide improved means for providing a range correlation for the directional response of a passive sensor to a radiative target.

It is another object of the subject invention to provide means for correlating the respective reflective and radiative returns received from a multiple-source target by an active ranging sensor and a passive sensor.

It is still another object of the invention to provide scan converter means for correlating the direction of a radiative target return with the distance of a reflective target along such direction.

It is yet another object of the invention to provide scan converter means for correlating a radiative return received from a target at a given direction with a reflective return received from such multiple-energy target.

It is a further object of the invention to provide scan converter means for distinguishing a target which is both reflective and radiative from targets which are merely either radiative or reflective and not both.

These and other objects of the subject invention will become apparent from the following description, taken together with the accompanying drawings in which.

In the figures, like reference characters refer to like parts.

Figure 1:
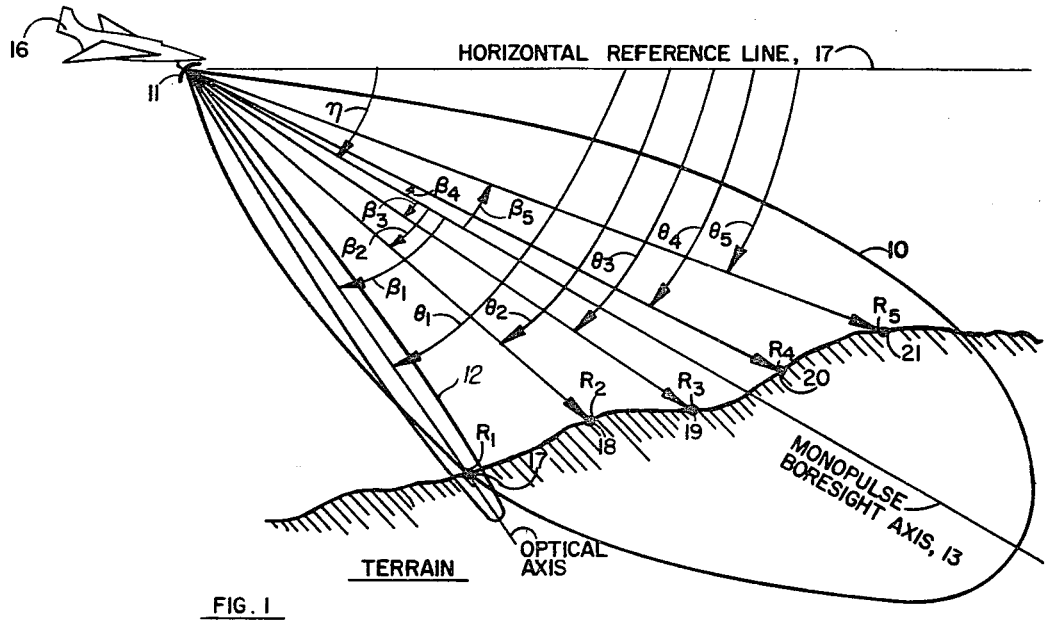
FIG. 1 is an elevation view of an exemplary beamwidth of a conventional monopulse radar antenna and an exemplary view angle of a vertically scanned passive optical sensor in an airborne terrain mapping situation.

Referring now to FIG. 1, there is illustrated an elevation view of an exemplary beamwidth 10 of a conventional monopulse radar antenna (located at point 11) and an exemplary view angle response pattern 12 of a passive optical sensor (located proximate to point 11) in an airborne arrangement adapted for a terrain-mapping application. The antenna boresight axis 13 of antenna pattern 10 originating from the airborne position 11 (provided by an aircraft 16) is oriented in a substantially forward-looking direction and angularly declined at a vertical angle ($\eta$) relative to a horizontal reference line 17.

Figures 2A, 2B, 2C:
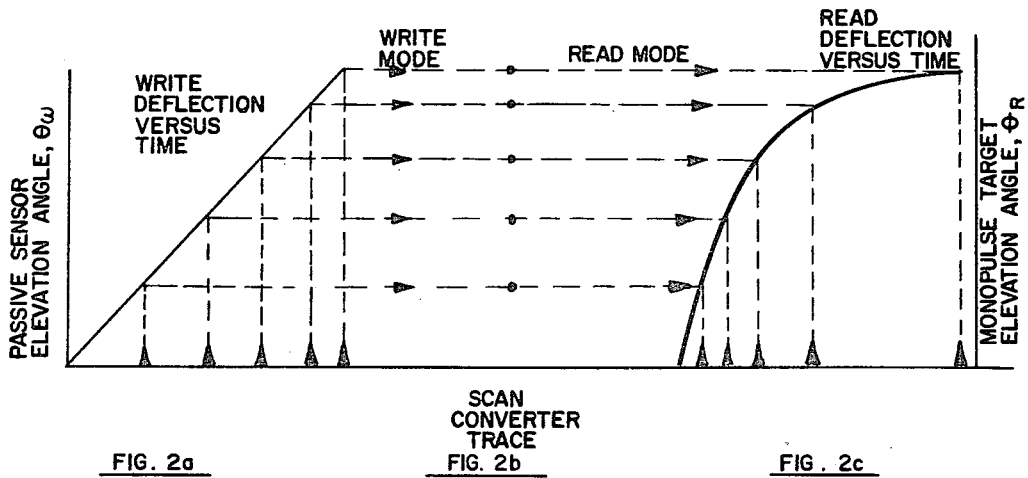
FIGS. 2a, 2b and 2c are respective representations of the time response of the optical sensor of FIG. 1, a stored signal or "write" trace resulting from the response of a scan converter to the optical sensor, and the read-out response of the scan converter in response to a target angle scanning signal input from the monopulse system of FIG. 1.

In accordance with the concepts of the invention, to be more fully described hereinafter, the view angle response pattern 12 of a passive optical sensor is caused to cyclically scan in elevation (or nod) over a range of view angles corresponding to the vertical beamwidth of the monopulse antenna. The response of the passive sensor to terrain radiation points 17, 18, 19, 20 and 21 (of FIG. 1) as a function of the vertical scanning angle $\theta$ thereof (as shown in FIG. 2a) is then stored in signal storage means such as a scan converter, as shown in FIG. 2b.

In the "read" mode, the scan converter is scanned in accordance with the detected target angle ($\theta = \eta + \beta$) of a monopulse radar target, the time occurrence of such monopulse angle corresponding to the range of the detected monopulse target associated with such radar target angle. In other words, the passive sensor signal trace stored in the scan converter is read out in a serial time fashion corresponding to the monopulse range time associated with such (monopulse target) angles. Hence, range correlation is provided to the passive sensor response by means of the concept of the invention.

Figure 3:
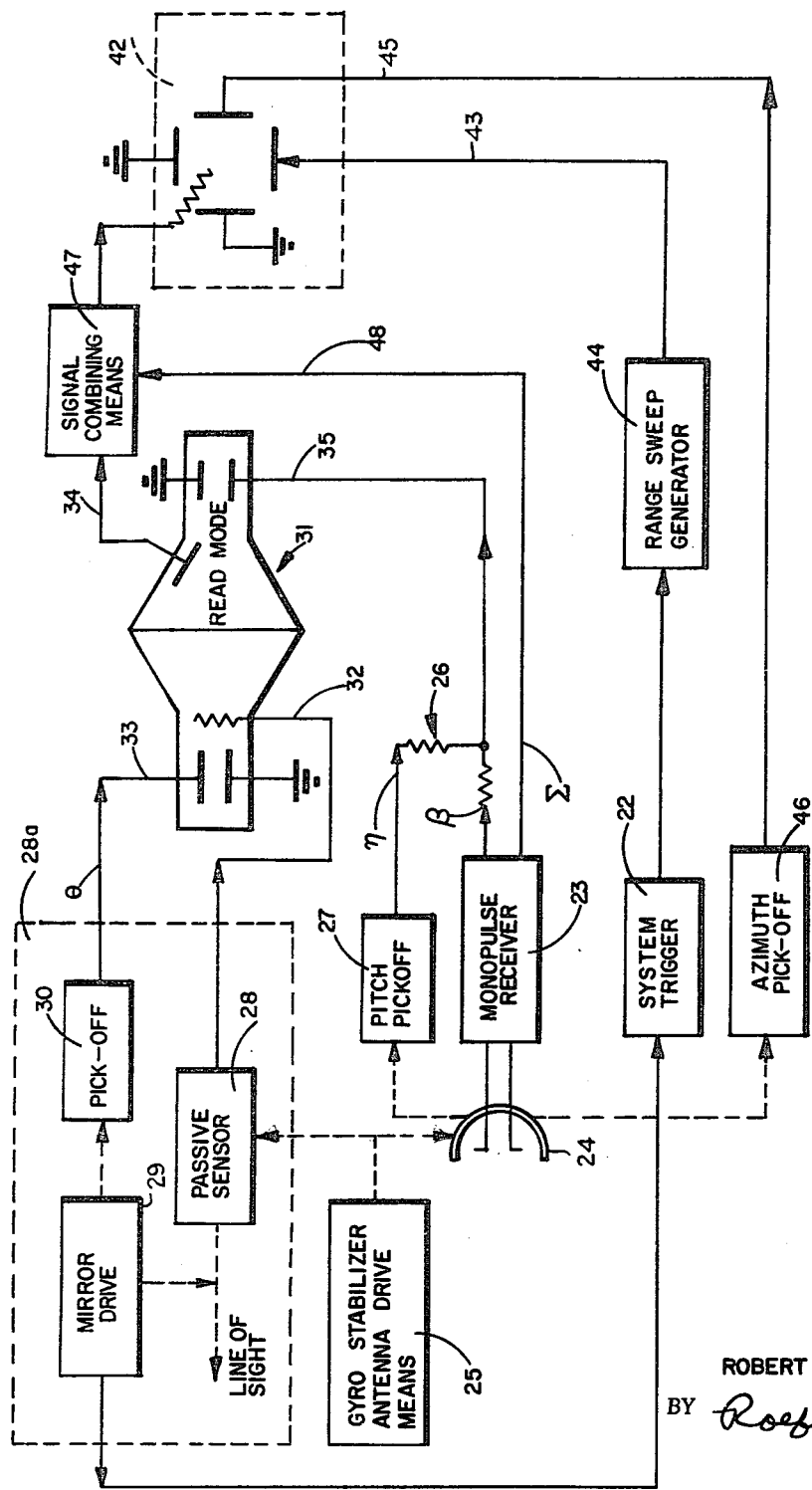
FIG. 3 is a block diagram of a system embodying the concept of the invention.

An exemplary mechanization of a system embodying the concept of the invention is shown in FIG. 3.

Referring to FIG. 3, there is illustrated a block diagram of a system embodying the concept of the invention. There is provided a monopulse radar system adapted for airborne use for providing signals having a magnitude indicative of the angle-off-boresight, $\beta$, of a reflective radar target and a periodic time occurrence (relative to the system trigger) indicative of the slant range or distance thereof. Such radar system is comprised of a system trigger 22, a transmitter (not shown), a monopulse receiver 23, and a multi-aperture microwave antenna 24 in driven relationship to antenna drive means 25. Drive means 25 provides means for scanning the antenna in azimuth and may also include means for space stabilization of the antenna, as is well understood in the art. The construction and arrangement of such monopulse radar system is well-known to those skilled in the art, being described for example in "Introduction to Monopulse System" by Rhodes (published by McGraw-Hill, 1959); therefore such elements are shown in block form only.

By summing at signal summing means 26 the receiver signal indicative of the radar target angle-off-boresight, $\beta$, and a signal from antenna elevation pickoff means 27 indicative of the antenna declination $\eta$, a signal is provided which is indicative of the elevation angle, $\theta$, of a detected monopulse radar target return, the time occurrence thereof (relative to the system trigger response) being indicative of the range thereof.

The overall aperture of antenna 24 for a ground mapping application, is preferably broad in azimuth and narrow in elevation to achieve a broad elevation beamwidth and narrow azimuth beamwidth (i.e., a vertical fan-shaped beampattern), as is well understood in the art. Such vertical fan-shaped beampattern 10 is scanned in azimuth, $a$ as shown in FIG. 4.

There is further provided in the arrangement of FIG. 3, a passive optical sensor 28 such as, for example, an infrared sensitive point scanning device which is boresighted relative to the boresight axis of radar antenna 24. Sensor 24 provides an electrical output signal in response to the total light energy received over the spectral bandwidth to which the device is responsive, in response to energy sources lying within a selected view angle. The construction and arrangement of sensor 28 is well understood, such devices being commercially available, as is described more fully hereinafter.

Figure 4:
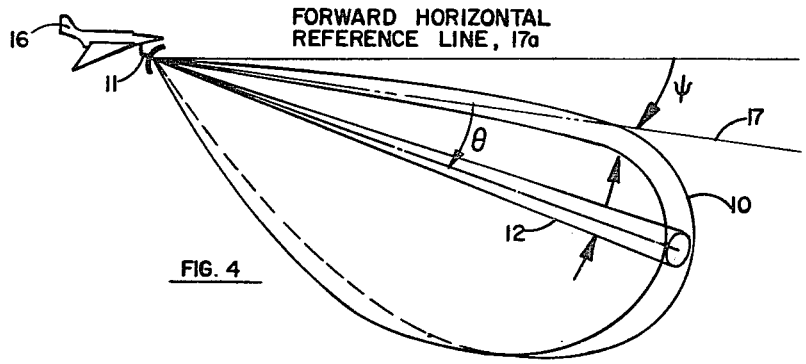
FIG. 4 is a view in elevation of the azimuthally scanned vertical fan-shaped antenna pattern for the antenna of FIG. 3, and containing the vertically scanned passive sensor response pattern of the passive sensor of FIG. 3.

The optical axis of the receiver optics of sensor 28 is boresighted substantially parallel to the boresight axis of antenna 24, and mounted relative thereto, whereby the azimuth scanning mode of drive means 25 commonly scans the antenna beampattern 10 and the optical resonse pattern 12 in azimuth, as shown in FIG. 4. There is further provided means 29 for adjusting the vertical view angle $\theta$ of the response pattern 12 of passive sensor 28 for vertical scanning within the vertical beamwidth 10 of antenna 24, as shown in FIG. 4. Such vertical scanning means may consist of a mirror drive or motor rotating a hexagonal element, the six equal sides of the hexagon being reflectively coated and the element being disposed relative to the optical input of sensor 28 so as to cyclically vary the orientation of the sensitive direction thereof in a vertical direction which is contained within the azimuthal extent of antenna beamwidth 10, as shown in FIG. 4. Where the speed of the motor is maintained substantially constant, the vertical scanning angle varies linearly with periodic time.

A position pickoff 30 cooperates with the mirror drive to provide a signal indicative of the vertical angle $\theta$ to which the response pattern of sensor 28 is oriented. Such pickoff needs be geared up relative to the shaft displacement of mirror drive 29 by a ratio equal to the number of sides of the polygon reflector element employed, as is well understood in the art. Because the specific arrangement of the vertical scanning means 29 and vertical scanning pickoff 30 are not critical and are within the skill of the art, these elements are shown in block form only in FIG. 3. In fact, a device 28a of integrated design comprising an infrared sensor 28, mirror drive 29 and pickoff 30 is commercially available under the tradename Reconofax VI from HRB Singer Inc. of Science Park, State College, Pa.

There is further provided in FIG. 3 a scan converter 31 arranged for providing radar range correlation of the passive sensor response to different vertical view angles. A write mode modulation input 32 and associated write mode vertical sweep input 33 of scan converter 31 are responsively connected to the respective outputs of passive sensor 28 and pickoff 30.

The gain, or amplitude level, of the pickoff angle signal is then adjusted so that a maximum angle of interest corresponds to and produces full deflection of the write-mode sweep of scan converter 31. Because scanning means 29 varies the elevation view angle $\theta$ of the passive sensor at a constant rate, the time base of the stored IR signal traces is substantially a linear function of changes in the view angle $\theta$, as shown in FIG. 2a.

A vertical read-sweep input 35 (of scan converter 31 in FIG. 3), is responsively connected to source 26 of radar target angle signals. The radar target angle signal on line 35 is similarly scaled as the pickoff angle signals on line 33, whereby radar target angle signals corresponding to like angles as the pickoff angle signals (for deflecting the "write" gun) produce a correspondingly similar deflection of the read gun. Hence, the read-out or output line 34 of a stored passive sensor signal corresponding to a given vertical view angle $\theta$ occurs at a time interval (relative to the system trigger) associated with a radar return from such direction $\theta$, and which is indicative of the radar slant range of the reflective radar target in such direction.

Because of the variable nature of the terrain profile, together with the selected angle $\eta$ at which the antenna bore-sight is depressed, the radar target angle observed as a function of radar range time is not in general linear, as shown in FIG. 2c. However, because the radar target angle signal (from element 26 in FIG. 1) is used as the read-sweep signal, the time-base of the stored passive sensor signals is converted to that of the received radar returns for corresponding view angles.

Also, because the scan converter converts the time scale of the stored passive sensor signals as a function of view angle $\theta$ to a function of radar range time, it is not necessary that the periodicity of mirror drive means 29 be synchronized with the system trigger 22. It is only necessary that the read-out mode read the stored image traces or lines at no greater rate than they are being generated by the write mode. For this reason, it may be desirable to responsively couple system trigger 22 to a periodic output of mirror drive 29 to assure a common rate of speed for the write-in and read-out operations of scan converter 31.

Figure 5:
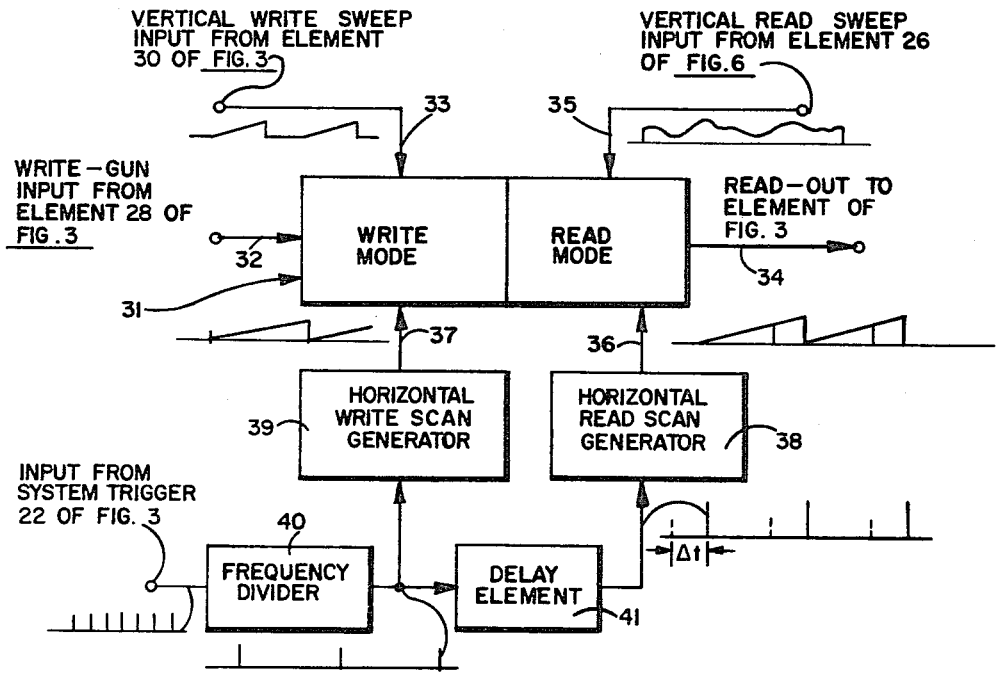
FIG. 5 is a further representation in block form of the arrangement of the scan converter of FIG. 3.

Also, horizontal "read" and "write" scan generators must be included for cooperation with the respective read-sweep and write-sweep inputs, whereby successive vertical data traces, corresponding to successive azimuth increments of the azimuthally scanning antenna 24 and associated passive sensor 28, may be separately processed, as shown in FIG. 5.

Referring to FIG. 5, there is illustrated in greater particularity the cooperation of scan converter 31 of FIG. 3. In addition to the read and write vertical sweep inputs, and write gun input (shown in FIG. 3), there is further provided a read and write horizontal scan input 36 and 37 of scan converter 31. Horizontal scan inputs 36 and 37 are responsively connected to respective ones of like scan generators 38 and 39, which are in turn responsively connected to system trigger 22 (of FIG. 3). Interposed between the input from system trigger 22 and scan generators 38 and 39 is frequency divider (reference numeral) 40 for providing an integer submultiple frequency, the integer of which corresponds to the number of traces or successive azimuth increments to be displayed as a data set on the storage element of scan converter 31. Hence, if sixteen successive range traces, corresponding to sixteen successive azimuth increments, are to be read out of the time-scale converting means 31, then the integer of frequency divider 40 would be sixteen, and the integer submultiple 1/16. The time interval thus provided between successive data traces occurring at a given vertical line (i.e., the time interval occurring between every sixteenth data trace), coupled with the trace-attenuating action of the read mode in read-sweeping such vertical line, assures adequate "erase" action prior to writing a subsequent data trace at such vertical line.

There is further provided in the arrangement of FIG. 5 a delay element 41 interposed between the output of frequency divider 40 and the input to horizontal read scan generator 38. The purpose of such slight delay is to cause the read scan generator output to lag behind that of the write scan generator whereby the read-out mode is prevented from attempting to read or erase the same vertical trace that the write mode is attempting to generate. Hence, only after a given data trace is written in by the cooperation of the vertical "write" sweep input 33 and modulation input 32, is such trace then read-out by the cooperation of the delayed vertical "read" sweep input 36 with read-out line 34.

The output on line 34 is thus a periodic video output, the period of which corresponds to a selected azimuth, and the time phase of which relative to the system trigger corresponds to a selected slant range distance. Such output may be applied to the modulation input of a display element such as PPI indicator 42 of FIG. 3. The range sweep input 43 of indicator 42 may be connected to a range sweep generator 44 (which is synchronized with system trigger 22), and the azimuth control input 45 of indicator 42 responsively connected to an azimuth pickoff 46 of antenna 24.

Hence, the cooperation of scan converter 31 with indicator 42 (in FIG. 3) provides a modulation of the indicator display at a point of the range sweep thereof and azimuth input thereto corresponding to a passively sensed radiative terrain feature to be mapped.

Also, such display of a range-correlated passive sensor output may be gated (in FIG. 3) by the sum channel output (on line 48) of monopulse receiver 23, applied to signal combining means 47, whereby a display occurs only for the coincidence of a received radar return (of suitable strength or threshold value) and a passive sensed radiation from a given combination of direction (azimuth and elevation angle) and range distance, as to be indicative of a multiple-energy source (i.e., a target which is both infrared emissive and radar reflective).

Further, while the intensity of such gated infrared signal is indicative of the strength of the radiative source so detected (such as for example a decoy bonfire or accidental forest fire), it is not necessarily indicative of the combined strength of the radiative and reflected signals at such direction and range as to clearly indicate the quality or "hardness" of a cultured target so sensed (a target both infrared emissive and radar reflective). A so-called "hard" target indication or "shade of gray" signal indicative of the "hardness" of a combined radiative and reflective target may be obtained by additively combining or multiplicatively combining the sum-channel signal output of receiver 23 with the output of scan converter 31 by signal combining means 47, which may comprise alternatively a summing network or pentode multiplier, the construction and arrangment of which are well known in the art.

Accordingly, there has been described improved means for effecting range correlation of a passively sensed source of radiation, and signal correlation of the radiative and reflective directional signal returns from a target which is both radiative and reflective.

Although, the invention has been described in terms of converting the time-base of a directional passive sensor response to that of a directional radar response, it is clear that the concept of the invention is not so limited. For example, signal correlation of the radiative and reflective directional returns from a target which is both radiative and reflective may be accomplished by writing in or storing the received (radar) reflective returns as a function of the direction thereof, then reading out such stored reflective signals as a function of the direction of a passive sensor response. Thus, the stored radar signals for a given direction may be combined with the passive sensor signals for a like direction to effect correlation of several types of signals received from a multiple-energy type target in such direction. Also, the azimuthally scanned system need not be limited to ranging means such as a radar, but may comprise a second passive sensor which is sensitive to a portion of the radiation spectrum different from that of the first passive sensor, whereby the common (azimuth and elevation) direction from which signals of both spectra are received may be determined.

Although the invention has been described and illustrated in detail, it is to be clearly understood that the same is by way of illustration and example only and is not to be taken by way of limitation, the spirit and scope of this invention being limited only by the terms of the appended claims.

I claim:
1. In a system having two directional sensors for providing respective first and second time-varying directional signals having mutually distinguishable time bases, means for converting the time-variation of one of said signals into the time base of the other, comprising:
   means responsive to one of said sensors for storing a first time varying signal indicative of the direction of a first sensed parameter, and
   means responsive to the directivity of the other of said sources for reading out said stored first signal in accordance with the time base of said second signal.

2. In cooperation with a monopulse radar providing periodic signals having a magnitude and time-occurrence indicative of the direction and range-distance respectively, of a detected radar target return,
   a passive sensor having a line of sight oriented relative to the boresight axis of said radar,
   means for periodically varying the line of sight of said sensor relative to said boresight axis, and
   scan converter means responsive to said sensor and said periodic means for storing the output response of said sensor as a function of the direction associated therewith, and further responsive to said monopulse radar for reading out said stored sensor response as a function of the direction of a detected radar target return and at the time-occurrence thereof,
   whereby the radar range of a multiple energy radar target is correlated with the passively sensed image thereof.

3. In cooperation with a ground mapping monopulse radar having an azimuthally scanning antenna,
   a passive IR sensor scanned azimuthally in synchronism with said antenna;
   means for periodically nodding the line of sight of said sensor in elevation;
   storage means responsive to said sensor and said periodic means for storing the response of said sensor as a function of the line of sight elevation angle associated with such response; and
   read-out means responsive to said monopulse radar for reading out the storage means as a function of the elevation angle associated with a detected radar return and the radar range-time associated with such radar return, whereby the radar range to a multiple IR-radar target is correlated with the sensed IR image thereof.

4. Means for correlating radiated and reflected energies from a multiple source target comprising, in combination:
   monopulse ranging means for providing periodic signals having a magnitude and time occurrence indicative of the direction and range distance of a reflective target return;
   passive sensing means having a line of sight whose direction periodically varies relative to the boresight axis of said monopulse means for detecting a radiative target; and
   scan converter means responsive to said sensing means for storing the response thereof to radiative targets as a function of the direction thereof, and further responsive to said monopulse means for reading out said stored response as a function of the direction of said reflective target return and at the time of occurrence of said return.

5. Means for correlating radiated and reflected energies from a multiple source target comprising, in combination:
   monopulse ranging means for providing periodic signals having a magnitude and time occurrence indicative of the direction and range distance of a reflective target return,
   passive sensing means having a line of sight whose direction periodically varies relative to the boresight axis of said monopulse means for detecting a radiative target, and
   scan converter means responsive to said sensing means for storing the response thereof to radiative targets as a function of the direction thereof, and further responsive to said monopulse means for reading out said stored response as a function of the direction of said reflective target return and at the time occurrence of said return, and
   display means responsive to said scan converter means and said monopulse means for providing a display indicative of the range of said radiative target.

6. Means for correlating radiated and reflected energies from a multiple source target comprising, in combination:
   monopulse ranging means for providing periodic signals having a magnitude and time occurrence indicative of the direction and range distance of a reflective target return,
   passive sensing means having a line of sight whose direction periodically varies relative to the boresight axis of said monopulse means for detecting a radiative target, and
   scan converter means responsive to said sensing means for storing the response thereof to radiative targets as a function of the direction thereof, and further responsive to said monopulse means for reading out said stored response as a function of the direction of said reflective target return and at the time occurrence of said return, and
   signal modulation means for modulating one of a reflected target return and radiative return by the other of said returns.

7. Means for correlating radiated and reflected energies from a multiple source target comprising, in combination:
   monopulse ranging means for providing periodic signals having a magnitude and time occurrence indicative of the direction and range distance of a reflective target return,
   passive sensing means having a line of sight whose direction periodically varies relative to the boresight axis of said monopulse means for detecting a radiative target, and
   scan converter means responsive to one of said ranging means and said sensing means for storing the response thereof to radiative targets as a function of the direction thereof, and further responsive to the other of said monopulse means and said sensing means for reading out said stored response as a function of the associated direction of the response of said other means;
   signal modulation means for modulating one of a reflected target return and radiative return by the other of said returns; and
   display means responsive to said modulation means and said monopulse means for providing a display indicative of the direction of said multiple source target.

8. Means for correlating radiated and reflected energies from a multiple source target comprising, in combination:
   monopulse ranging means for providing periodic signals having a magnitude and time occurrence indicative of the direction and range distance of a reflective target return,
   passive sensing means having a line of sight whose direction periodically varies relative to the boresight axis of said monopulse means for detecting a radiative target, and
   scan converter means responsive to said sensing means for storing the response thereof to radiative targets as a function of the direction thereof, and further responsive to said monopulse means for reading out said stored response as a function of the direction of said reflective target return and at the time occurrence of said return;
   signal modulation means for modulating one of a reflected target return and radiative returns by the other of said returns; and display means responsive to said modulation means and said monopulse means for providing a display indicative of the range and direction of said multiple source target.

9. In a system having two cyclical scanning sensors, each providing a first and second time-varying signal, said second signals corresponding to a common scanned parameter other than time and the signals of a first one of said sensors having a time-base mutually distinguishable from that of the signals of the other of said sensors, scan converter means for converting a first one of the signals of one of said sensors to the time base of the other, comprising a scan converter having a write-scan mode responsive to said second signal of one of said sensors for storing a first signal therefrom and further having a read-out scan mode responsive to said second signal of said second sensor and read-scanning parallel to said write scan mode for reading out said stored first signal in accordance with the time base of the signals from said second sensor.

References Cited
UNITED STATES PATENTS
3,191,169    6/1965    Shulman et al. _____ 343—5

RODNEY D. BENNETT, JR., Primary Examiner

M. F. HUBLER, Assistant Examiner

U.S. Cl. X.R.

343—7